(12) United States Patent
Huang et al.

(10) Patent No.: US 8,457,829 B2
(45) Date of Patent: Jun. 4, 2013

(54) SYSTEM AND METHOD FOR DETERMINING CHARACTERISTICS OF A PHYSICAL ENVIRONMENT WITH SIMPLE MOTION PATTERNS

(75) Inventors: Qingfeng Huang, San Jose, CA (US); Ying Zhang, Cupertino, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 777 days.

(21) Appl. No.: 12/709,413

(22) Filed: Feb. 19, 2010

(65) Prior Publication Data
US 2011/0205012 A1 Aug. 25, 2011

(51) Int. Cl.
*G01C 22/00* (2006.01)
*G05D 1/00* (2006.01)
*G05D 2/00* (2006.01)
*G05D 3/00* (2006.01)
*G05D 4/00* (2006.01)
*G05D 5/00* (2006.01)

(52) U.S. Cl.
USPC .............................................. 701/25; 701/26

(58) Field of Classification Search
None
See application file for complete search history.

(56) References Cited

U.S. PATENT DOCUMENTS

2006/0012493 A1* 1/2006 Karlsson et al. ......... 340/995.24
2007/0265741 A1* 11/2007 Ol et al. ......................... 701/23

* cited by examiner

*Primary Examiner* — Brian Zimmerman
*Assistant Examiner* — Cal Eustaquio
(74) *Attorney, Agent, or Firm* — Patrick J. S. Inouye; Krista A. Wittman

(57) ABSTRACT

A system and method for determining characteristics of a physical environment with simple motion patterns are provided. A plurality of raw orientation readings are received from a simple motion pattern. A distribution of possible wall orientations upon each raw reading is determined. Wall direction is determined as the mean value of the distribution.

16 Claims, 5 Drawing Sheets

SYSTEM AND METHOD FOR DETERMINING CHARACTERISTICS OF A PHYSICAL ENVIRONMENT WITH SIMPLE MOTION PATTERNS

The U.S. Government has a paid-up license in this invention and the right in limited circumstances to require the patent owner to license others on reasonable terms as provided by the terms of Contract No. HR0011-08-C-0032 awarded by DARPA.

FIELD

This application relates in general to characterization of a physical environment by mobile robots and, in particular, to a system and method for determining characteristics of a physical environment with simple motion patterns.

BACKGROUND

Mobile relay networks interconnect one or more mobile nodes, a centralized communication system, or base station, and one or more user nodes. Frequently, mobile nodes, or mobile robots, are deployed in physical environments that are uncharted, remote, or inaccessible to conventional measuring techniques. To function most effectively, mobile robots need to discover the properties of the physical environment they are located in. Knowing details of the location can assist navigation, communication, and object retrieval or placement.

Generally, mobile robots use self-contained on-board guidance systems, which can include environmental sensors to track relative movement, detect collisions, identify obstructions, or provide an awareness of the immediate surroundings. Sensor readings are used to plan the next robotic movement or function to be performed. Movement can occur in a single direction or could be a sequence of individual movements, turns, and stationary positions.

Mapping the physical environment can help determine the size of the area explored by the robot, and, if the robot gets stuck or otherwise blocked by an obstacle, allows the robot to return to a known, higher value area. The identification of the physical environment also helps to determine whether the entire area has been traversed, what part of the area has provided better connectivity between the robot, base station, and users, as well as optimize efficient movement of the robot, which maximizes battery life and minimizes time of exploration.

Conventional modes of traversing of the physical environment by robots include using long-range sensors, such as cameras and lasers to detect obstacles in front of or surrounding the robot. Long-range measurement of the environment has a large Overhead, both economically due to the high cost of components and to battery consumption. Additionally, high-level computer cognitive models are used for environment mapping but incur a high computational overhead.

Therefore, there is a need for an approach to identifying features of the physical environment that is cost-effective and efficient. Preferably, such an approach will be able to filter out errors created by obstacles within the physical environment.

SUMMARY

Characteristics of a physical environment are determined based on data collected by a mobile robot. The mobile robot motion pattern and ongoing analysis of data received from sensors and can identify orientation, type, and area size of the environment.

An embodiment provides a system and method for determining characteristics of a physical environment with simple motion patterns. A plurality of raw orientation readings are received from a simple motion pattern. A distribution of possible wall orientations upon each raw reading is determined. Wall direction is determined as the mean value of the distribution.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Figure 1:
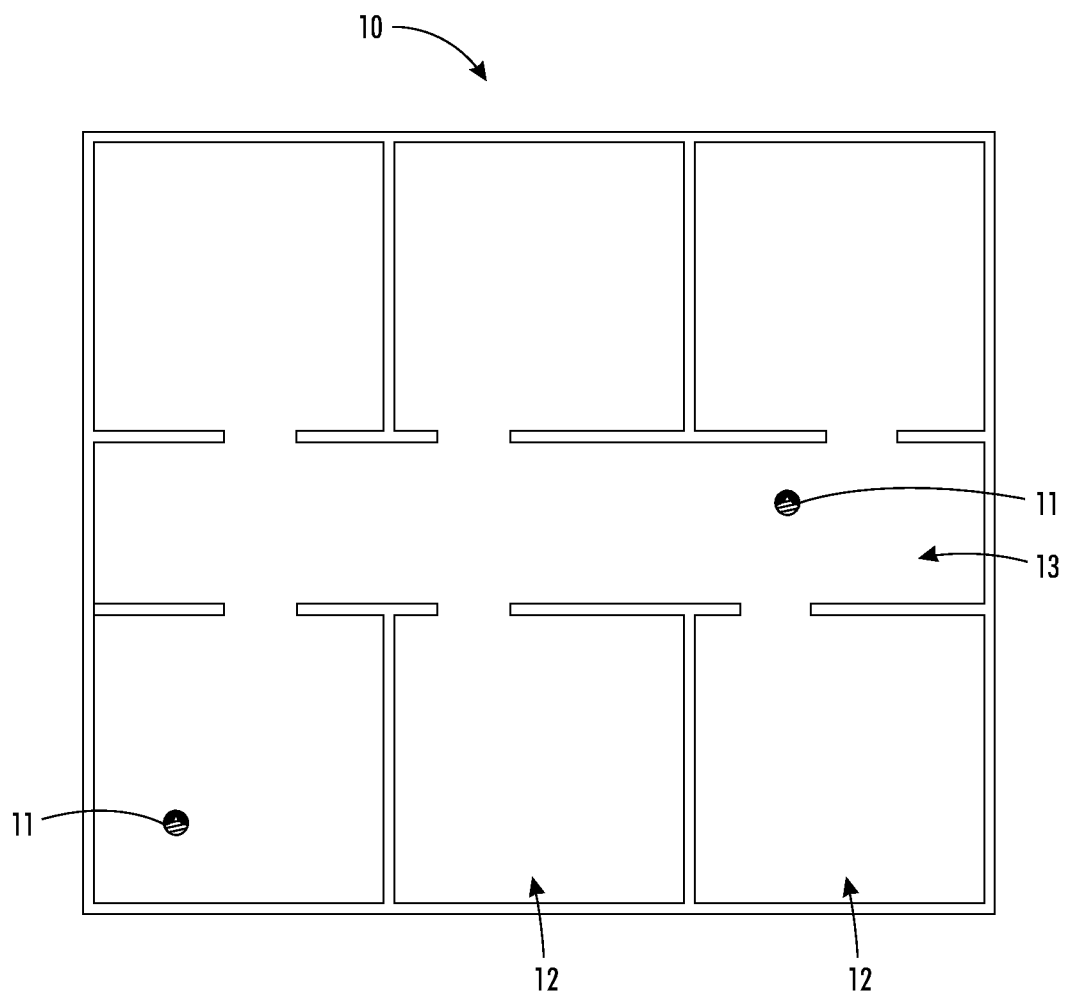
FIG. 1 is a block diagram showing, by way of example, a representative physical environment for deployment of a mobile robot.

A physical environment is characterized based on motion patterns of a mobile robot. FIG. 1 is a block diagram showing, by way of example, a representative physical environment 10 for deployment of a mobile robot 11. The physical environment can include one or more rooms 12 and hallways 13 separated by walls. One or more mobile robots 11 can be deployed within the physical environment 10.

In one embodiment, the mobile relay nodes are implemented using mobile robots 11. The mobile robot 11 can include a power source, a communication interface to interface to other robot nodes, base stations, and user nodes. The robot can also include motive power and a self-contained guidance system to move and guide the mobile robot about the environment, odometry to measure the distance traveled by, and position of, the mobile robot 11 within the environment, a left touch sensor and a right touch sensor, a heading component to calculate the heading of the robot around a 360 degree axis extending longitudinally through the center of the robot. In a further embodiment, the mobile robot 11 can include one or more short-range, such infrared or ultrasonic, wall sensors for detection of an object, such as a wall, prior to the robot coming into physical contact with the object. Other robot structures and components are possible.

The robot 11 can also include an interface to a processor that can be implemented as an embedded micro-programmed system or as a general-purpose portable computer system, such as a notebook computer. The processor includes one or more modules for analyzing data gathered by the robot to characterize the physical environment in which the robot is deployed, as described herein. The processor is a programmable computing device that executes software programs and includes, for example, a central processing unit, memory, network interfaced, persistent storage, and various components for interconnecting these components. The modules can be implemented as a computer program or procedure written as source code in a conventional programming language and is presented for execution by the central processing unit as object or byte code. Alternatively, the modules could also be implemented in hardware, either as integrated circuitry or burned into read-only memory components. The various implementations of the source code and object and byte codes can be held on a computer-readable storage medium, such as a floppy disk, hard drive, digital video disk (DVD), random access memory (RAM), read-only memory (ROM) and similar storage mediums. Other types of modules and module functions are possible, as well as other physical hardware components.

Figure 2:
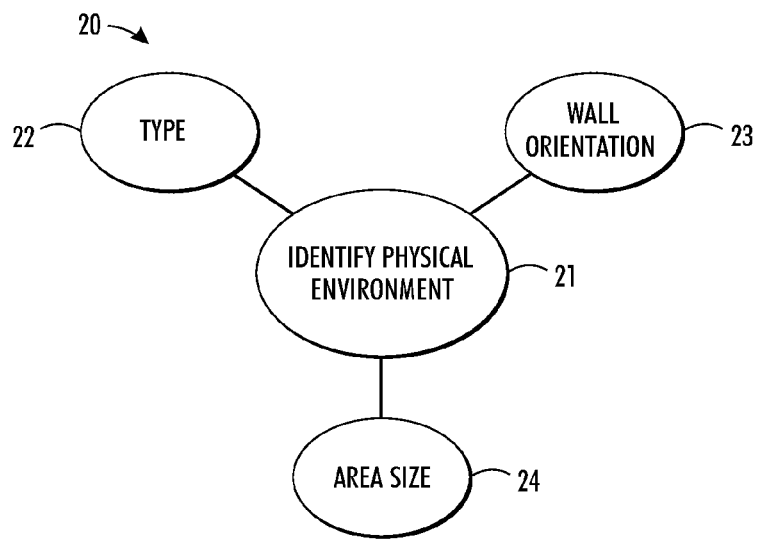
FIG. 2 is a block diagram showing, by way of example, characteristics of a physical environment that can be identified.

Characteristics of the physical environment are determined from simple motion patterns of the mobile robot. FIG. 2 is a block diagram 20 showing, by way of example, characteristics of a physical environment 21 that can be identified, including type of physical environment 22, wall orientation of the physical environment 23, and area size of the physical environment 24. The environment type 22 can include determining whether the robot is within a room or a hallway, as further discussed below with reference to FIG. 3. The wall orientation 23 includes determining the direction of one or more walls in the physical environment and can include statistically removing outlier data created by obstacles in the physical environment, as further discussed below with reference to FIG. 5. Determining the size of the area of the physical environment 24 is further discussed below with reference to FIG. 6. Other characteristics of the physical environment are possible.

Figure 3:
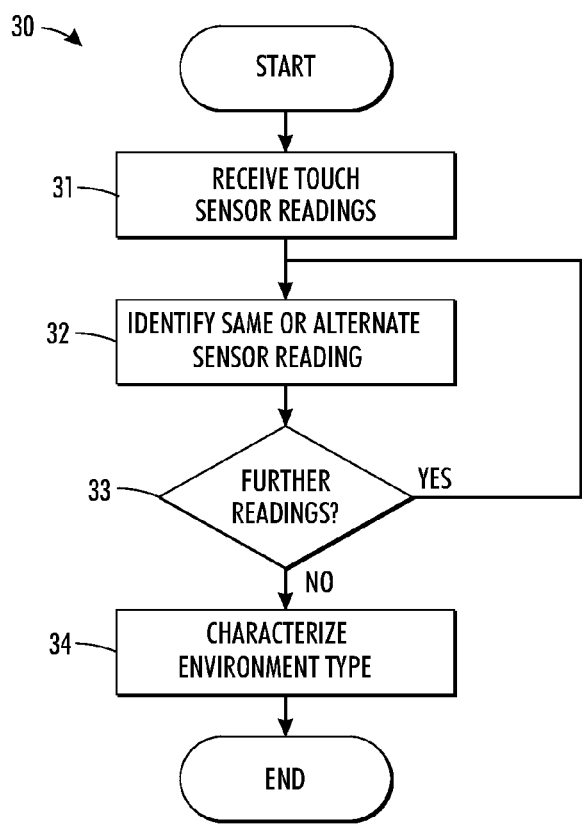
FIG. 3 shows, by way of example, a method for determining a type of physical environment a mobile robot is located within using rectilinear motion.

As the robot moves around the physical environment, objects are encountered that trigger the touch sensors and the order in which the sensors are triggered can then be used to determine the type of environment. FIG. 3 shows, by way of example, a method 30 for determining a type of physical environment the mobile robot is located within using rectilinear motion. The robot moves in a linear direction until at least one of the touch sensors detects an object through contact, assumed to be a wall, and is triggered. When only one of the touch sensor readings is triggered, the mobile robot rotates 90 degrees toward the untriggered sensor and continues along a linear path until at least one of the sensors is again triggered and rotates 90 degrees toward the next untriggered sensor. When both sensors are triggered substantially simultaneously, indicating that the heading of the robot is orthogonal to the triggering object, the robot rotates 135 degrees in either direction before heading in a linear direction.

In one embodiment, the robot rotates 135 degrees in the same direction as the robot rotated in response to the most recent triggering of a single touch sensor. In a further embodiment, the robot determines whether rotating right or left will orient the robot in a direction to an area of the environment that has been less explored by the robot. For example, the robot uses odometry and heading readings to analyze the previous locations traversed and rotates 135 degrees in the direction of the less traversed area. Alternatively, the robot rotates 135 in the direction of the area that has been more traversed. Other rotation scenarios are possible. In a still further embodiment, the robot rotates first 90 degrees when both sensors are triggered, detects the wall using the wall sensor, and then rotates a further 45 degrees in the same direction before heading in a linear direction. Determination of rotation direction is carried out as discussed in relation to the 135 degree rotation.

The robot stores the order in which the touch sensors are triggered. Touch sensor readings are received when trigged (block 31) and whether the same or the alternate sensor is triggered after the previous reading is identified (block 32). For example, readings of left sensor, left sensor result in a same sensor count (SSC) of one. Readings of left sensor, right sensor, left sensor are identified as an alternate sensor count (ASC) of two, where left-right is one ASC and right-left is the second ASC. The order is analyzed on an ongoing basis as each new reading is detected (block 33). The pattern of the readings from the touch sensors is then used to characterize the environment type (block 34), as further discussed below with reference to FIGS. 4A-E.

Figure 4A:
FIGS. 4A-E are block diagrams showing characterization of an environment type for use in the method of FIG. 3.
Figure 4B:
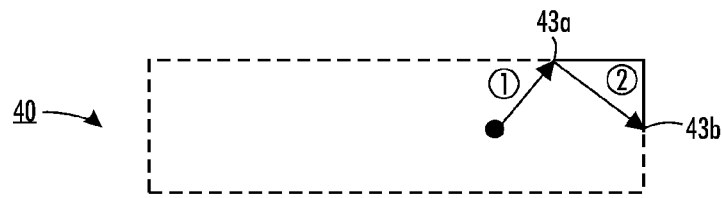

Characterization of the physical environment is tabulated from the order of touch sensor readings. FIGS. 4A-E are block diagrams 40, 46 showing the characterization of an environment type as discussed above with reference to FIG. 3. Referring first to FIG. 4A, initially, the mobile robot is either in a stationary starting position 41, or already moving along a path within an undefined environment 42. As the robot moves along path 1, as seen in FIG. 4B, the left sensor detects 43a an object and then rotates 90 degrees toward the Hat sensor heading along path 2, where the left sensor is again triggered 43b. Two consecutive readings by the left sensor is identified as SSC=1, which is characterized as a corner.

Figure 4C:
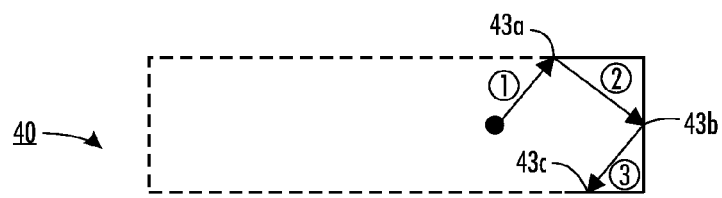

Referring next to FIG. 4C the robot rotates 90 degrees toward the untriggered right sensor and moves along path 3. The third consecutive left sensor reading is received and is identified as SSC=2, which is characterized as a half room.

Figure 4D:
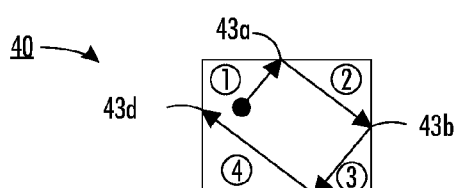

In FIG. 4D, the robot has moved along paths 1 through 4 and has detected the same left sensor triggered at each point 43a-d along the way, thus, SSC=3, indicating that the physical environment is a room.

Figure 4E:
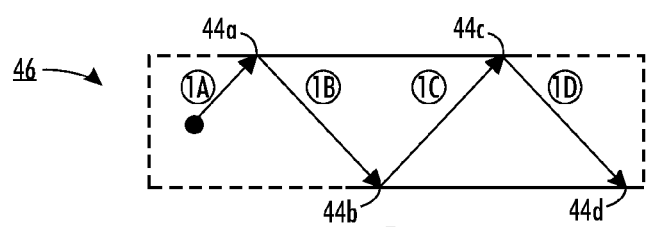

In FIG. 4E, the robot, in a different physical environment 46 than FIGS. 4A-D, has moved along path 1A through 1D and has identified alternating, left 44a-right 44b-left 44c-right 44d, touch sensor triggering, so that ASC=3, indicating that the physical environment is a hallway. Any ASC value where ASC=2, can be characterized as a hallway. Awareness of whether the robot is located in a room or hallway can aid in enhancing connections to a wireless network and improve indoor navigation by the robot. For example, wireless communication between a mobile robot and other devices is generally better in hallways that when in rooms due to interference and signal degradation caused by the intervening walls.

In a further embodiment, the width of the hall is determined and used to further characterize the environment 46. When ASC=2, three points where the alternating sensors are triggered, for example, 44a, 44b, and 44c, define the points of a triangle. For example, x-coordinates and y-coordinates are determined by the odometry for each point 44a, 44b, and 44c. The distance between any two of the points can be calculated according to the equation $D=\sqrt{dx^2+dy^2}$ where dx is the difference between the x-coordinates of the points and dy is the difference between the y-coordinates of the points. Using the distances calculated by the odometry between the three points, the width can be determined.

The width, W, of the hall is determined according to the equation:

$$W = |AB| \times (|BC|/|AC|)$$

where $|AB|$ is the distance from point 44a to 44b, $|BC|$ is the distance from point 44b to 44c, and $|AC|$ is the distance from point 44a to 44c. The environment is characterized as a hallway when $2W=L$, as, generally, hallways have a width that is less than or equal to the hallway length.

Figure 5:
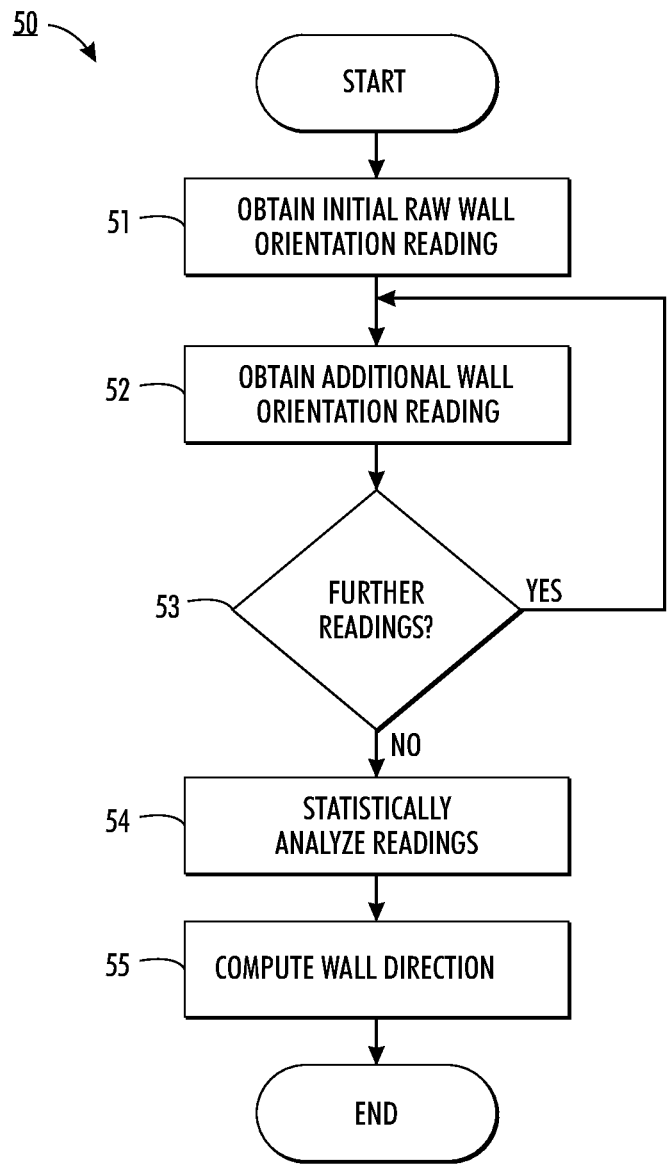
FIG. 5 is a flow diagram showing a method for determining wall orientation of a physical environment, in accordance with one embodiment.

Wall orientation calculation is performed after each new raw orientation reading is obtained. FIG. 5 is a flow diagram showing a method 50 for determining wall orientation of the physical environment, in accordance with one embodiment. An initial raw wall orientation reading relative to the frame of reference of the robot is received (block 51). The robot frame of reference is determined based on the initial positioning, or pose, of the robot when deployed in the physical environment. Alternatively, the pose of the robot can be reset to the initial position at anytime prior to collecting orientation readings. For example, the initial position of the robot can be set with coordinates $(x_i, y_i)$ and orientation $\theta_i$, where $x_i$ and $y_i=0$, and $\theta_i=0$ degrees. The odometry and heading components of the robot then collect distance and coordinate data and orientation readings, respectively, as the robot traverses the environment.

Next, additional wall orientation readings are received (block 52) as the robot moves about the environment. Then, a decision is made to whether further readings are required to determine the wall orientation (block 53). Next, statistical analysis of the readings is performed (block 54). Finally, the wall direction and, optionally, standard deviation is calculated (block 55).

Raw wall orientation readings can be obtained from a number of motion patterns. The motion pattern can be predetermined, selected from a group of patterns based on readings of the environment, or randomly selected. Other ways of motion pattern selection are possible. In one embodiment, raw wall orientation readings are obtained using rectilinear motion, as further discussed above with reference to FIGS. 3-4E. If the left and right touch sensors are triggered substantially simultaneously the robot is heading in a direction orthogonal to the detected wall and the current heading of the robot is obtained. If ASC=2 is determined, as further discussed above with reference to FIG. 4E, the direction of sensor reading 44a to 44c or 44b to 44d relative to the robot frame of reference is determined. For example, given readings with coordinates $(x_a, y_a)$ for point 44a and $(x_c, y_c)$ for point 44c, the direction from 44a to 44c, $\theta_r$, relative to the robot frame can be determined according to $\theta_r = \arctan 2(y_c - y_a, x_c - x_a)$.

When SSC readings are triggered, as discussed above with reference to FIGS. 4A-D, wall orientation readings can also be determined. For example, positional data collected can be used to determine other characteristics of the environment, such as area size based on pair-wise distance, such as discussed further below with reference to FIG. 6.

In a further embodiment, raw wall orientation readings are obtained using a wall-following motion pattern. After the robot detects a wall through a touch sensor, the robot rotates until the wall sensor detects the wall and continues on a path parallel to the detected wall until another wall is detected and is then followed accordingly. The heading of the robot along the wall is used as the raw wall orientation reading. In a further embodiment, the robot heading is used only if the wall sensor reflection intensity value is above a threshold value, while robot heading data is not used when intensity values are below the threshold value.

In a yet further embodiment, a mid-point motion pattern is used to obtain raw wall orientation readings. In this scenario, the robot moves until a wall is detected by the touch sensors, rotates until the wall sensor senses the wall and then moves along the wall for a predetermined distance before turning 90 degrees away from the wall and heading in a new direction. Additional raw wall orientation readings are obtained in the same manner. The heading of the robot along the wall is used for the raw wall orientation reading. Other motion patterns are possible.

The raw wall orientation readings are statistically analyzed through a continuously adjusted distribution. Assuming that opposite walls in a room or hallway are parallel and adjacent walls are orthogonal to one another, a uniform distribution of possible wall orientations is generated. Initially, the orientations are uniformly distributed between −45 to +45 degrees from the reference frame of the robot set with five-degree precision, though other precision values are possible. All wall orientation readings are modified by a multiple of 90 degrees to fit the robot frame of reference of −45 to +45 degrees.

After each raw wall orientation reading, the distribution is recalculated to incorporate the new reading. Given an actual angle $\theta_a$, the probability of reading $\theta_r$ is given by the equation:

$$p(\theta_r \mid \theta_a) = \frac{1}{\sqrt{2\pi}\sigma} e^{-\frac{(\theta_a - \theta_r)^2}{\sigma^2}} \tag{1}$$

Given the prior distribution for $\theta_a$, the new distribution after the next reading is given by the equation:

$$p(\theta_a \mid \overline{\theta}_r^{k+1}) \propto p(\theta_r \mid \theta_a) \cdot p(\theta_a \mid \overline{\theta}_r^k) \tag{2}$$

where s, is the standard deviation, and k is the k'th reading of wall direction. In one embodiment the standard deviation is set to five degrees. Other standard deviation settings are possible.

Wall direction is determined as the mean value, $\theta_w$, of the distribution $p(\theta_a)$:

$$\theta_w = \sum_{\theta_a = -45}^{45} \theta_a p(\theta_a) \tag{3}$$

The standard deviation of the wall direction is determined from the equation:

$$STD = \sqrt{\sum_{\theta_a = -45}^{45} (\theta_a - \theta_w)^2 p(\theta_a)} \tag{4}$$

In a further embodiment, wall orientation readings are obtained until the standard deviation of the determined wall direction meets a threshold value, for example, less than one degree. Other threshold values are possible. The requirement of a threshold value can factor out obstacles and other sources of noise within the physical environment, such as furniture, that can trigger the touch that can lead to false positives for the touch sensors that would lead to outlier data and errors in the wall orientation determination.

Figure 6:
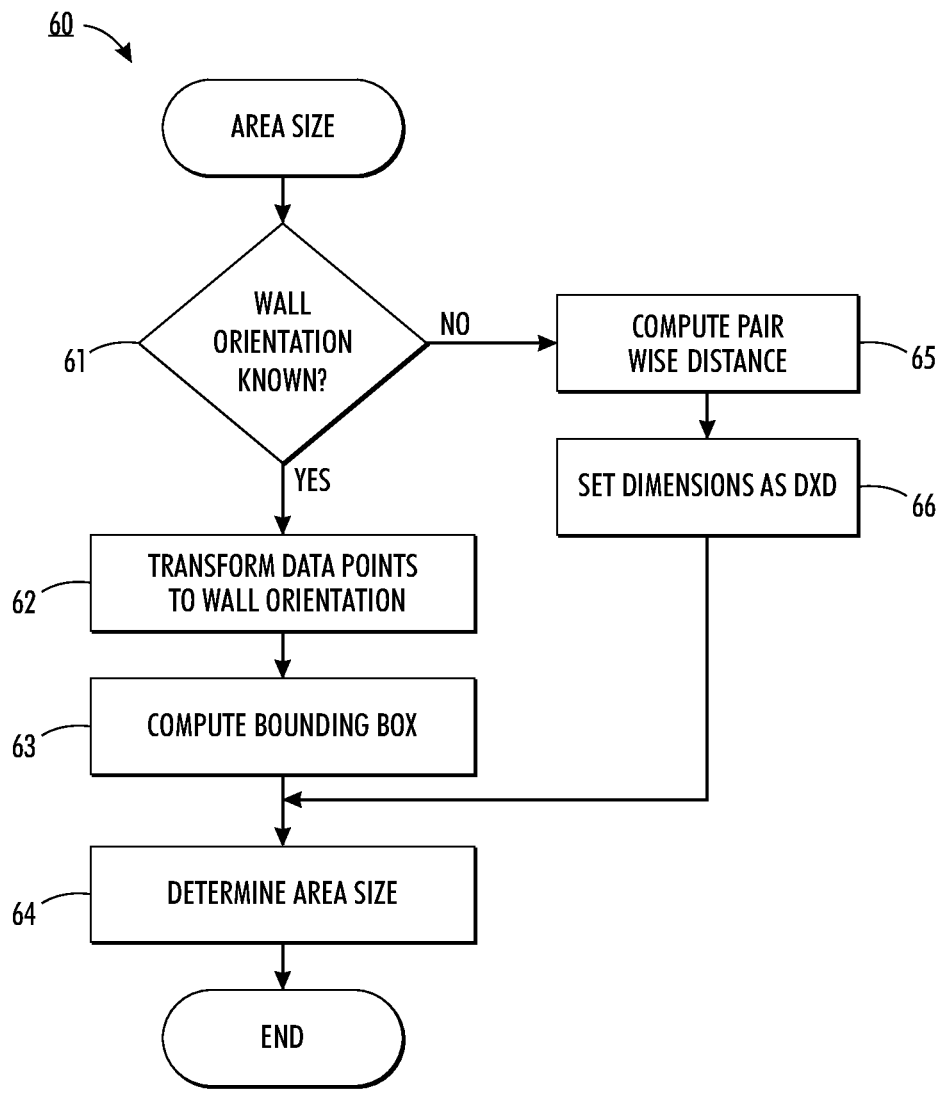
FIG. 6 is a flow diagram showing a method for determining area size of a physical environment.

FIG. 6 is a flow diagram showing a method for determining area size of the physical environment. A decision is first made whether the wall entry orientation is known or not (block 61). If the wall orientation is known or has been previously determined such as further described above with reference to FIG.

5, the data from the wall orientation is transformed to the actual orientation of the physical environment (block 62). In particular, given a determined wall orientation of $\theta_w$, each point $(x_1, y_1) \ldots (x_n, y_n)$ from the robot reference frame can be transformed to $(x_{w1}, y_{w1}) \ldots (x_{wn}, y_{wn})$ according to the equations:

$$x_{wn} = x_n \cos(\theta_w) + y_n \sin(\theta_w) \text{ and}$$

$$y_{wn} = -x_n \sin(\theta_w) + y_n \cos(\theta_w).$$

The transformed data is then computed as a bounding box (block 63), which is then used to determine the area size (block 64). The area size is determined from L×W, where L, length, $L = \max(x_w) - \min(x_w)$ and $W = \max(y_w) - \min(y_w)$ are obtained from the bounding box.

If the wall orientation is unknown, then the pair-wise distance between all points is determined (block 65). The area size is then set based on the longest distance between two points. For example, if the longest distance between any two points is d, then the dimensions of the area are set to d×d and the area is calculated accordingly (block 66).

While the invention has been particularly shown and described as referenced to the embodiments thereof, those skilled in the art will understand that the foregoing and other changes in form and detail may be made therein without departing from the spirit and scope of the invention.

What is claimed is:

1. A system for determining characteristics of a physical environment with simple motion patterns, comprising:
   a heading module for receiving a plurality of raw orientation readings from a simple motion pattern comprising at least one of a predetermined motion pattern, a motion pattern selected from a group of patterns based on a physical environment from which the raw orientation readings are received, and a randomly selected motion pattern;
   a distribution module for determining a distribution of possible wall orientations upon each raw reading, wherein the distribution is initially a uniform distribution from −45 to +45 degrees and is sequentially determined upon each of the raw readings according to the equation:

$$p(\theta_a/\theta_r^{k+1}) \propto p(\theta_r/\theta_a) \cdot p(\theta_a/\theta_r^{-k})$$

where $p(\theta_r/\theta_a)$ is the probability of reading $\theta_r$, given an actual angle $\theta_a$, and $k$ is the k'th raw wall orientation reading; and
   a direction module for determining wall direction as the mean value of the distribution.

2. A system according to claim 1, wherein the simple motion pattern comprises one of rectilinear motion, wall-following motion, and mid-point motion.

3. A system according to claim 1, further comprising:
   an odometry module for receiving odometry readings along the simple motion pattern;
   a transformation module for transforming the odometry readings to the determined wall direction;
   a box module for calculating a bounding box for the transformed odometry readings;
   a size module for determining an area size of the physical environment from the bounding box.

4. A system according to claim 1, further comprising:
   an odometry module for receiving odometry readings along the simple motion pattern;
   an analysis module for analyzing a largest distance between two points from the odometry readings; and
   a size module for determining an area size of the physical environment from the largest distance.

5. A system according to claim 4, further comprising:
   a pair-wise module determining the pair-wise distance between each of the odometry readings;
   a distance module for identifying the largest distance between any of the two odometry readings; and
   a dimension module for setting the area size dimension as the largest distance.

6. A system according to claim 1, further comprising:
   a touch module for receiving a plurality of touch sensor readings;
   a touch order module for analyzing an order of touch sensor readings as same or alternating; and
   a type module for determining the type of physical environment from the order.

7. A system according to claim 6, further comprising:
   an order identification module for identifying the order as three same sensor readings; and
   a characterization module for characterizing the area type as a room.

8. A system according to claim 6, further comprising:
   a order identification module for identifying the order as at least two alternate sensor readings; and
   a characterization module for characterizing the area type as a hallway.

9. A method for determining characteristics of a physical environment with simple motion patterns, comprising:
   receiving a plurality of raw orientation readings from a simple motion pattern comprising at least one of a predetermined motion pattern, a motion pattern selected from a group of patterns based on a physical environment from which the raw orientation readings are received, and a randomly selected motion pattern;
   determining a distribution of possible wall orientations upon each raw reading, wherein the distribution is initially a uniform distribution from −45 to +45 degrees and is sequentially determined upon each of the raw readings according to the equation:

$$p(\theta_a/\theta_r^{k+1}) \propto p(\theta_r/\theta_a) \cdot p(\theta_a/\theta_r^{-k})$$

where $p(\theta_r/\theta_a)$ is the probability of reading $\theta_r$, given an actual angle $\theta_a$, and $k$ is the k'th raw wall orientation reading; and
   determining wall direction as the mean value of the distribution.

10. A method according to claim 9, wherein the simple motion pattern comprises one of rectilinear motion, wall-following motion, and mid-point motion.

11. A method according to claim 9, further comprising:
    receiving odometry readings along the simple motion pattern;
    transforming the odometry readings to the determined wall direction
    calculating a bounding box for the transformed odometry readings; and
    determining an area size of the physical environment from the bounding box.

12. A method according to claim 9, further comprising:
    receiving odometry readings along the simple motion pattern;
    analyzing a largest distance between two points from the odometry readings; and
    determining an area size of the physical environment from the largest distance.

13. A method according to claim 12, further comprising:
determining the pair-wise distance between each of the odometry readings;
identifying the largest distance between any of the two odometry readings; and
setting the area size dimension as the largest distance.

14. A method according to claim 9, further comprising:
receiving a plurality of touch sensor readings;
analyzing an order of touch sensor readings as same or alternating; and
determining the type of physical environment from the order.

15. A method according to claim 14, further comprising:
identifying the order as three same sensor readings; and
characterizing the area type as a room.

16. A method according to claim 14, further comprising:
identifying the order as at least two alternate sensor readings; and
characterizing the area type as a hallway.

* * * * *